(12) United States Patent
Rousseau et al.

(10) Patent No.: US 12,723,871 B2
(45) Date of Patent: Sep. 1, 2026

(54) INSTRUMENT AND METHOD FOR MEASURING THE CURVATURE AND REFLECTIVITY OF A SURFACE OF A SAMPLE

(71) Applicant: RIBER, Bezons (FR)

(72) Inventors: Youri Rousseau, Maisons Laffite (FR); Jean-Louis Guyaux, La Vernelle (FR); Alexandre Arnoult, Auzeville-Tolosane (FR)

(73) Assignee: RIBER, Bezons (FR)

( * ) Notice: Subject to any disclaimer, the term of this patent is extended or adjusted under 35 U.S.C. 154(b) by 101 days.

(21) Appl. No.: 18/699,884

(22) PCT Filed: Oct. 11, 2022

(86) PCT No.: PCT/EP2022/078272
§ 371 (c)(1),
(2) Date: Apr. 9, 2024

(87) PCT Pub. No.: WO2023/062020
PCT Pub. Date: Apr. 20, 2023

(65) Prior Publication Data

US 2024/0401939 A1 Dec. 5, 2024

(30) Foreign Application Priority Data

Oct. 11, 2021 (FR) ....................................... 2110739

(51) Int. Cl.

*G01B 11/255* (2006.01)
*G01N 21/47* (2006.01)
*G01N 21/55* (2014.01)

(52) U.S. Cl.
CPC ........... *G01B 11/255* (2013.01); *G01N 21/47* (2013.01); *G01N 21/55* (2013.01); *G01N 2021/4735* (2013.01); *G01N 2021/558* (2013.01)

(58) Field of Classification Search
CPC .............. G01B 11/255; G01B 11/2513; G01B 2210/56; G01B 11/25; G01N 21/47; G01N 21/55; G01N 2021/4735; G01N 2021/558
See application file for complete search history.

(56) References Cited

U.S. PATENT DOCUMENTS 4,588,270 A * 5/1986 Tamaki .................. A61B 3/107 351/212
5,477,332 A * 12/1995 Stone ..................... G01N 21/55 356/613

(Continued)

FOREIGN PATENT DOCUMENTS

CN 214374270 U 10/2021
FR 3066816 A1 11/2018
WO WO-2018215507 A1 * 11/2018 ......... G01B 11/2522

OTHER PUBLICATIONS

International Search Report for PCT/EP2022/078272 dated Jan. 20, 2023, 5 pages.

(Continued)

*Primary Examiner* — Michael P LaPage
(74) *Attorney, Agent, or Firm* — NIXON & VANDERHYE

(57) ABSTRACT

The invention relates to an instrument for measuring the curvature of a surface of a sample (8), comprising a light source (1) and a mask (2), Ie light source (1) illuminating the mask (2) so as to generate a light beam (10) incident on the surface of the sample and to form a light beam (20) reflected by the sample. According to the invention, the mask (2)

(Continued)

comprises a transparent background and opaque patterns (14) arranged at predetermined positions, the opaque patterns (14) of the mask having a total surface area smaller than the surface area of the transparent background, the instrument comprises an imaging system (5) and a camera (6) suitable for forming an image (32) of the mask by reflection on the sample (8), an image processing system being suitable for processing the image (32) of the mask by reflection on the surface of the sample, so as to deduce therefrom the radius of the curvature of the sample (8).

8 Claims, 1 Drawing Sheet

(56) References Cited

U.S. PATENT DOCUMENTS 9,070,590 B2 6/2015 Camm
2002/0126293 A1* 9/2002 Deck .................. G01B 11/2441 356/512
2004/0207836 A1* 10/2004 Chhibber ........... G01N 21/8806 356/237.4
2007/0002334 A1* 1/2007 Altman .............. G01M 11/0264 356/601
2007/0146685 A1* 6/2007 Yoo .................. G01N 21/95607 356/601
2007/0258092 A1* 11/2007 Finarov ............. G01N 21/8806 356/369
2011/0177624 A1* 7/2011 Camm ................... C21D 11/00 257/E21.53
2012/0327414 A1 12/2012 Xu
2013/0293726 A1* 11/2013 Armstrong-Muntner .................... G01N 21/958 348/187
2020/0158497 A1* 5/2020 Arnoult .............. G01B 11/2513
2021/0164777 A1* 6/2021 Ermakov ............. G01B 11/255
2023/0054161 A1* 2/2023 Liang ................... G01B 11/255

OTHER PUBLICATIONS

Written Opinion of the ISA for PCT/EP2022/078272 dated Jan. 20, 2023, 6 pages.

* cited by examiner

INSTRUMENT AND METHOD FOR MEASURING THE CURVATURE AND REFLECTIVITY OF A SURFACE OF A SAMPLE

CROSS-REFERENCE TO RELATED APPLICATIONS

This application is the U.S. national phase of International Application No. PCT/EP2022/078272 filed Oct. 11, 2022 which designated the U.S. and claims priority to FR 2110739 filed Oct. 11, 2021, the entire contents of each of which are hereby incorporated by reference.

PRIOR ART

The present invention relates to the technical field of instruments for measuring optical surface properties of a sample.

More precisely, the invention relates to an instrument for measuring optical surface properties of a sample comprising a light source and a mask located between the light source and the sample surface, the light source being suitable to illuminate the mask so as to generate by transmission through the mask a light beam incident on the sample surface and to form a reflected light beam, scattered and/or transmitted by the sample.

In particular, the invention finds applications in the non-destructive testing of the surface of a metal, semiconductor, especially silicon, ceramic or flat screen wafer following a surface treatment process such as deposition, etching or heat treatment.

BACKGROUND OF THE INVENTION

In the above field, the glass, metal, ceramic or semiconductor plate substrates generally have a low thickness between 0.1 millimetres and a few millimetres, for a circular, square or rectangular surface of surface area between 1 $cm^2$ and a few $m^2$. The surface treatments are liable to induce mechanical stresses in tension or compression in the substrate and to generate curvature deformations of the substrate. Such a curvature deformation induced in the substrate may be spherical or cylindrical. The curvature produced may be concave or convex relative to the treated surface. The radius of curvature of such deformation may be very large and may vary from one substrate to another in a same batch treated simultaneously in a same treatment chamber. The surface treatments may also generate an increase of surface roughness. It is important to detect and quantify these degradations of the substrate or the sample surface in a non-destructive manner and preferably in situ during the treatment.

It is known to measure the deformations of an image formed by reflection on a surface of a sample. The document FR 3066816 describes an optical device for measuring the curvature of a reflective surface, comprising a geometric lighting pattern composed of light points, a camera and an image analysis device to detect a variation of the distances between light points in the detected image. The document U.S. Pat. No. 9,070,590 describes an instrument for measuring a change in magnification of the size of the image reflected by the sample, to deduce therefrom a measurement of the sample's radius of curvature. The document CN214374270 describes a device for 4D hyperspectral topography using structured light.

Other measurement instruments can be used to measure the surface roughness and/or the absorption of a sample. For example, the document US 2012/327414 describes a device for measuring the roughness of a surface, in particular for controlling the manufacturing of LED. However, each measurement instrument generally requires at least one optical access path, for example a porthole, for use in situ. It is difficult to use several of these measurement instruments simultaneously, due to the very limited number of optical accesses available on the industrial deposition, etching or heat treatment reactors. Indeed, portholes may disturb the spatial homogeneity of the treatment. Industrial reactors have, by construction, a number of optical accesses generally limited to one, two or three.

However, it is desirable to measure simultaneously and in situ several parameters such as curvature, roughness and/or absorption of a sample.

It is desirable to propose measurement instrument and method for measuring simultaneously high-sensitivity curvature and at least one other optical surface property of a sample, such as reflection, absorption and/or scattering.

SUMMARY OF THE INVENTION

In order to remedy the above-mentioned drawbacks of the state of the art, the present invention proposes an instrument for measuring the surface curvature of a sample, the instrument comprising a light source and a mask located between the light source and the surface of the sample, the light source being suitable to illuminate the mask so as to generate by transmission through the mask a light beam incident on the surface of the sample and to form a light beam reflected by the sample.

More particularly, it is proposed according to the invention an instrument for measuring the surface curvature of a sample, wherein the mask has a transparent background and opaque patterns arranged at predetermined position on the surface of the mask, the opaque patterns having a total surface area smaller that the surface area of the transparent background, the instrument comprising an imaging system and a camera, the imaging system and the camera being suitable to receive at least one part of the reflected light beam and to form an image of the mask by reflection on the sample, an image processing system being suitable to process the image of the mask by reflection on the surface of the sample, calculate the respective positions of the patterns in said image and to compare the predetermined positions of the patterns of the mask with the calculated positions of the patterns in the image, in order to deduce therefrom at least one radius of surface curvature of the sample.

The high transparency of the mask (at least 50% and preferably more than 90%) makes it possible to obtain a reflected light beam of stronger light power. The same incident light beam generates by scattering on the sample, a scattered light beam having a light power able to be detected without the use of another light source or a lighting porthole. Finally, for some semiconductor samples, the incident light beam is partially transmitted through the sample, then reflected and again transmitted through the sample. The spectrum analysis of the light beam after transmission in the sample can enable to determine an absorption threshold of the sample and to deduce therefrom the temperature of the sample by the band edge thermometry technique.

Advantageously, the opaque patterns of the mask have a total surface area less than 15%, 10%, 5%, or even preferably 1%, of the mask surface area.

Other non-limiting and advantageous features of the instrument for measuring the curvature and reflectivity of a surface of a sample according to the invention, taken individually or according to all the technically possible combinations, are the following:

- the opaque patterns of the mask have a relative surface area less than 1% of the mask surface area;
- the mask patterns are arranged as a two-dimensional periodic matrix;
- the patterns have the shape of a grid, circles, discs, concentric ellipses (Placido discs), simply connected polygon or simply connected closed domain;
- the instrument further comprises an optical beam splitter and a spectrometer, the optical beam splitter being arranged so as to receive the reflected light beam and to transmit one part of the reflected beam towards the imaging system and another part of the reflected light beam towards the spectrometer, the spectrometer being suitable for measuring a power of the other part of the reflected light beam;
- the optical beam splitter comprises a plate beam splitter having an optical power distribution of 50-50, 40-60, 30-70, 10-90 or 20-80;
- the instrument includes another sensor arranged to measure a power of a light beam scattered by the sample and a signal processing system suitable for extracting from the scattered light measurement a measurement of the surface roughness of the sample;
- the instrument comprises a signal processing system suitable for receiving a power measurement of the reflected beam detected by the spectrometer and deducing therefrom a spectral reflectivity of the sample;
- the light source comprises a single source of white light, chosen for example among a halogen lamp or a light-emitting diode (LED).

The invention also proposes the use of an instrument according to one of the embodiments in combination with a treatment apparatus, for example for deposition, etching and/or heat treatment, for measurements in situ.

The invention also proposes a method for measuring the surface curvature of a sample, the method comprising the following steps: using a light source to illuminate a mask located between the light source and the surface of the sample, in order to generate by transmission through the mask a light beam incident on the surface of the sample and to form a light beam reflected by the sample, the mask including a transparent background and opaque patterns arranged at predetermined positions on the surface of the mask, the opaque patterns of the mask having a total surface area smaller than the surface area of the transparent background; receiving at least one part of the reflected light beam, placing an imaging system and a camera to receive the part of the reflected beam and to form an image of the mask by reflection on the surface of the sample, processing the mask image by reflection on the surface of the sample to calculate the respective positions of the patterns in said image, comparing the predetermined positions of the mask patterns with the calculated positions of the patterns in the image, in order to deduce therefrom at least one radius of curvature of the surface of the sample.

Obviously, the different features, alternatives and embodiments of the invention can be associated with each other according to various combinations, insofar as they are not incompatible or exclusive with respect to each other.

BRIEF DESCRIPTION OF DRAWINGS

Moreover, various other features of the invention emerge from the appended description made with reference to the drawings that illustrate non-limiting embodiments of the invention, and wherein.

It is to be noted that, in these figures, the structural and/or functional elements common to the different alternatives can have the same references numbers.

DETAILED DESCRIPTION OF THE INVENTION

Figure 1:
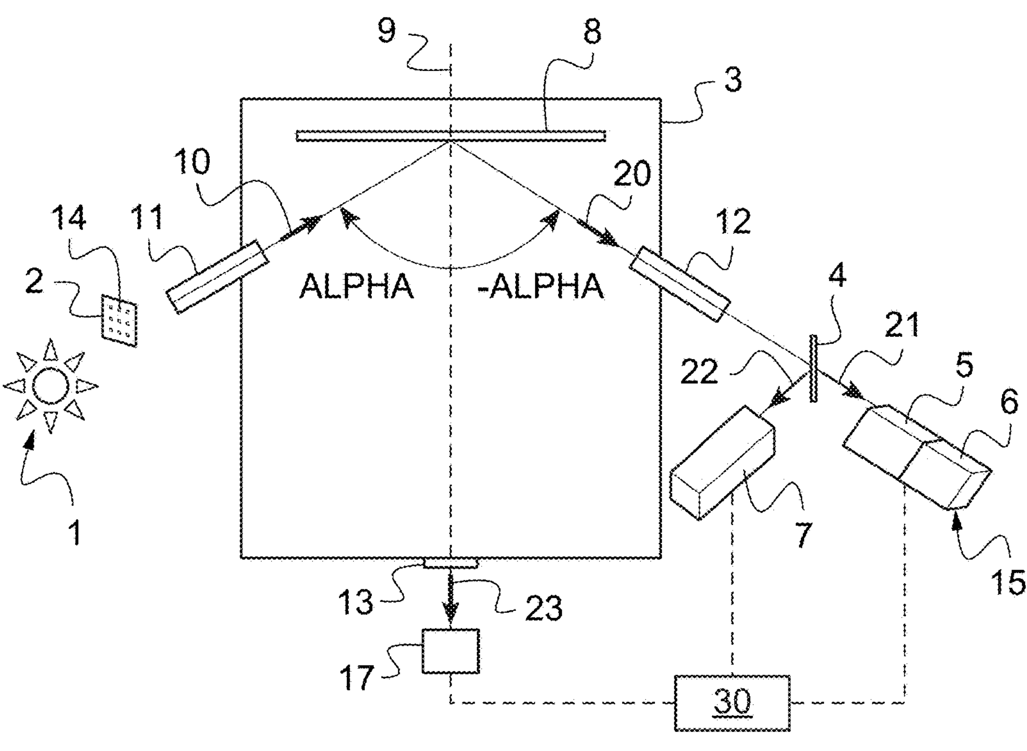
FIG. 1 is a view of an instrument for measuring the curvature and reflectivity of a surface of a sample according to the invention.

FIG. 1 shows an instrument for measuring the curvature and reflectivity of a surface of a sample 8. Sample 8 is here for example a plate of glass or a plate of semiconductor, for example silicon. More particularly, the considered sample is supposed to be flat. Sample 8 has a thickness generally between 0.1 millimetre and a few millimetres. Sample 8 generally has a circular, square or rectangular surface, with a surface area between 1 $cm^2$ and a few $m^2$.

In the example illustrated in FIG. 1, sample 8 is placed in the chamber 3 of a treatment apparatus. Chamber 3 here has an optical input port 11 and an optical output port 12. Optionally, chamber 3 includes another optical port 13.

The treatment apparatus is for example suitable for depositing thin layers on the sample surface or for etching the sample surface, as the apparatuses used in microlithography. Chamber 3 is for example a vacuum deposition chamber. In another example of use, the treatment apparatus is suitable for thermally treating the sample, for example performing a thermal annealing.

As an alternative the instrument may be used ex situ. In this case, there is no input/output port on the optical path of the incident or reflected light beam. The instrument of the present disclosure can also be used for measuring the radius of surface curvature of optical components such as lenses or mirrors and for simultaneously measuring the surface roughness.

The measurement instrument comprises a light source 1, a mask 2, an optical beam splitter 4, a spectrometer 7, an imaging system 5 and a camera 6, and a processor 30 comprising a signal processing system.

The light source 1 is able to emit a source light beam. Advantageously, the light source 1 is a source of white light. In the present document, it is meant by source of white light, a source emitting a light beam at a plurality of wavelengths, between 300 and 2000 nm. For example, the source comprises a halogen bulb, a reflector and an optical system. As an alternative, the source comprises a light-emitting diode (LED). The source light beam illuminates the mask 2.

Although the same light source is used for at least two simultaneous measurements, of radius of curvature and reflectivity, the light source 1 has a limited power, for example 1 W for a LED or at least 30 W for a halogen lamp.

The mask 2 is arranged between the light source 1 and the surface of the sample to be analysed. In the example illustrated in FIG. 1, the light source 1 and the mask 2 are arranged outside the chamber 3, the mask 2 being placed between the light source 1 and the optical input port 11 of the chamber 3. More particularly, the mask 2 comprises a transparent background and a plurality of opaque patterns 14 arranged at predetermined positions on the surface of the mask 2. The mask is for example manufactured on a support made of glass, polycarbonate or plexiglass, with a thickness between 0.5 and a few millimetres. The opaque patterns 14 of the mask have a total surface area less than 10% of the illuminated surface area of the mask 2. The opaque patterns 14 are advantageously spatially distributed along a two-dimensional periodic matrix. The shape of the opaque pattern is for example a cross, a disc, a square or any predetermined shape, geometric or not. By way of non-limiting example, the mask 2 includes N=9 opaque patterns distributed along a square grid, with a mesh of 5 mm, each pattern being a black disc of 0.5 mm diameter. In this example, the total surface of the opaque patterns is 0.35% of the surface area of the mask 2. The mask 2 has for example a surface area of 25.4 mm diameter.

The light beam that illuminates the mask 2 forms, by transmission through the mask 2, a light beam 10 incident on the surface of the sample 8. In the example of FIG. 1, the incident light beam 10 is transmitted into the chamber through the optical input port 11. The small relative surface area of the opaque patterns enables to obtain an intense incident light beam 10 on the sample, without increasing the power of the light source 1. The incident light beam 10 is advantageously collimated on the surface of the sample so that the maximum of light can be received on the receiver unit. As an alternative, the incident light beam 10 is focused on the surface of the sample.

The incidence angle of the incident light beam 10 with respect to the normal 9 to the surface of the sample 8 is denoted ALPHA. Advantageously, the incident light beam 10 is collimated. By reflection on the surface of the sample 8, a reflected light beam 20 is obtained. The reflected light beam 20 forms a symmetric angle −ALPHA with the normal 9 to the surface of the sample 8 at the point of incidence. The reflected light beam 20 is transmitted via the optical output port 12 to the outside of the chamber 3.

The optical beam splitter 4 is arranged outside the chamber 3 on the path of the reflected light beam 20. The optical beam splitter 4 spatially separates the reflected light beam 20 into two parts: one part 21 of the reflected beam is directed towards the imaging system 5 and the camera, whereas another part 22 of the reflected light beam is directed towards the spectrometer 7. Advantageously, the optical beam splitter 4 is a 50-50 splitter, so that the two portions of the reflected beam have the same power. As an alternative, the optical beam splitter 4 is a 40-60 or 20-80 splitter that transmits 20% of the light power towards the camera and 80% of the light power towards the spectrometer 7. For example, the optical beam splitter 4 is a thin-film plate separator, or a cube splitter or also a polarization splitter.

The imaging system 5 comprises for example the objective of the camera 6. The imaging system 5 and the camera 6 are arranged to receive the part 21 of the reflected beam. More precisely, the focus adjustment of the camera 6 is performed on the opaque patterns 14 of the mask 2 and not on the surface of the sample 8. That way, the imaging system 5 and the camera 6 are adjusted to form a clear image 32 of the mask 2 by reflection on the sample 8.

The camera 6 records the image 32 of the mask 2 by reflection on the sample 8. When the sample is flat, i.e. it has an infinite radius of curvature, the position of the patterns 34 in the image 32 corresponds to a linear transformation of the positions of the patterns of the mask 2. However, when the sample 8 has a curvature, the position of the patterns in the image is modified as a function of the radius of curvature of the sample. In the case of a cylindrical curvature, if the pattern matrix is aligned with the axis of the cylindrical deformation, the positions of the patterns 34 in the image 32 are modified along only one direction of space. In the case of a spherical curvature, the positions of the patterns 34 in the image 32 are modified along two transverse directions.

The image 32 is transmitted to the processor 30 that comprises a specially adapted image processing system. The image processing system is suitable for determining the position of each pattern 34 in the image 32. For example, the processing system calculates the variations of distance between adjacent patterns in a same way as the processing system described in the patent FR 3066816 to calculate a variation of distance between images of light points.

Figure 2:
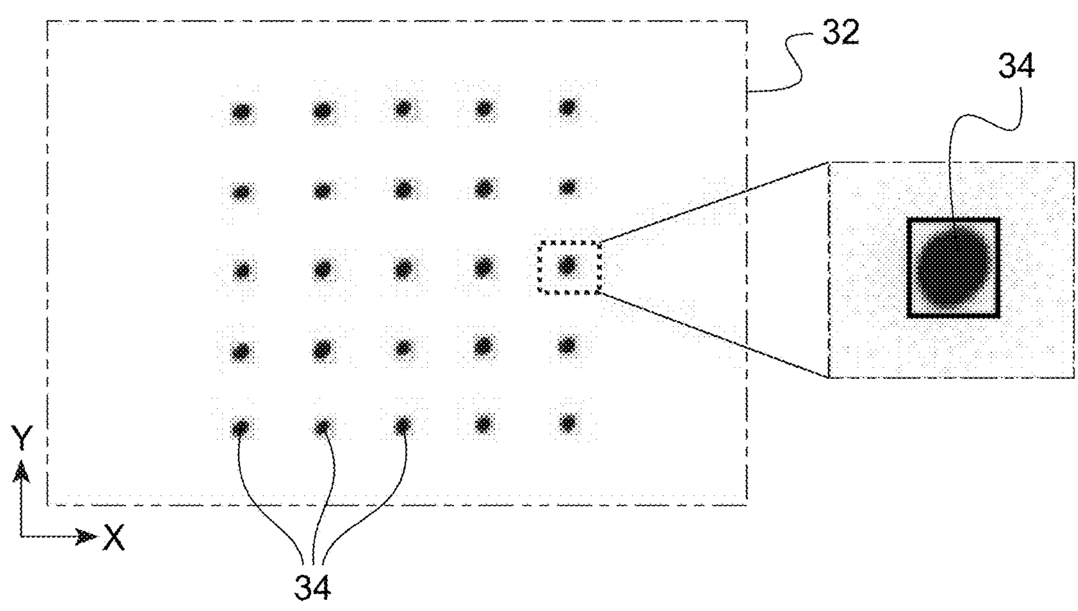
FIG. 2 is a view of an image of the mask including opaque patterns according to an exemplary embodiment.

In the example illustrated in FIG. 2, the shape of the patterns 34 in the image is elliptic. The patterns of the mask that is used here have a disc shape, all the patterns having a same diameter, and the patterns being arranged along a square grid. As the image 32 has a transparent background, the patterns are contrasted, which enable to determine with a great accuracy the position and/or the shape of the patterns 34. This enables to detect a curvature deformation of the sample, even if this curvature has a very large radius of curvature, for example greater than or equal to 100 km.

The spectrometer 7 receives the other part 22 of the reflected light beam. The spectrometer 7 is configured to measure a power of the other part 22 of the light beam specularly reflected as a function of the wavelength. For example, the spectrometer operates in the wavelength range between 300 nm and 2000 nm. The reflectivity of the sample, which is equal to the ratio between the reflected light power and the incident light power, is deduced from this measurement. As the transmission of the mask is higher than 90% and that the optical beam splitter also transmits a significant proportion of the reflected light beam, the power of the reflected light beam detected by the spectrometer has a high enough level to allow accurate measurements of the spectral reflectivity. The power of the reflected beam as a function of the wavelength over all the spectral range is measured using only one spectrometer 7.

Therefore, the instrument enables the simultaneous measurement of the radius of curvature of the sample with a very high sensitivity, for great radii of curvature, and of surface spectral reflectivity of the sample, with a great accuracy. The instrument requires only a few input/output ports. When the angle of incidence is non zero, it is sufficient to have two input/output ports 11, 13, arranged symmetrically with respect to the normal 9 to the surface of the sample 8. Particularly advantageously, the curvature measurement and the reflection measurement are performed using a single one source 1. This configuration enables to obtain a very compact instrument, as close as possible to the treatment chamber, and with lesser manufacturing costs compared to two distinct instruments.

As an option, another sensor 17 is arranged opposite another optical port 13 of the chamber. This other optical port 13 allows light scattered by the surface of sample 8 to be received. In the example illustrated in FIG. 1, the other optical port 13 is placed in front of the sample on the normal 9 to the surface of the sample 8. The other sensor 17 receives a light beam scattered at a specific solid angle, outside the specular reflection. That way, still with a single light source 1, three simultaneous measurements are obtained: radius of curvature, spectral reflectivity and diffusivity of a same illuminated area of the surface of a sample. The measurements can be performed in real time, at a high frequency (up to 100 Hz).

The scattered light intensity measurement is transmitted to the processor 30. The signal processing system enables to measure relative variations of surface roughness. A measurement of the relative variations of surface roughness of the sample is thus obtained, with a sensitivity and/or accuracy of the order of the nanometre.

As an alternative, the measurement of curvature by reflectivity is mounted in normal incidence. In this case, the source and the receiving side (camera and spectrometer) are mounted on the port 13 with another plate beam splitter. The roughness measurement is then mounted on another optical port 11 or 12, for example.

Of course, various other modifications can be made to the invention within the scope of the appended claims.

The invention claimed is:

1. An instrument for simultaneously measuring at least one radius of surface curvature and reflectivity of a sample, the instrument comprising:

a single light source used for the simultaneous measurements of the at least one radius of the surface curvature and the reflectivity of the sample;

a mask disposed between the single light source and the surface of the sample, the mask having a transparent background and opaque patterns arranged at predetermined positions on the mask surface, the opaque patterns of the mask having a total surface area smaller than a surface area of the transparent background, the light source being configured to illuminate the mask to generate by transmission through the mask a collimated light beam incident on the surface of the sample and to form a light beam reflected by the sample;

an imaging system;

a camera;

a spectrometer;

an optical beam splitter configured to receive the reflected light beam and transmit one part of the reflected light beam towards the imaging system and the camera that thereby form an image of the mask by reflection on the sample and another part of the reflected light beam towards the spectrometer that thereby measures a power of the other part of the reflected light beam, and an image processing system configured to:

process the image of the mask by reflection on the sample surface, calculate respective positions of the patterns in said image, compare predetermined positions of the patterns of the mask with the calculated positions of the patterns in the image, and perform the simultaneous measurements in real time at a frequency up to 100 Hz of (i) the at least one radius of the surface curvature of the sample based on the compared predetermined positions with the calculated positions and (ii) the reflectivity of the sample based on the measured power of the other part of the reflected light beam.

2. The instrument according to claim 1, wherein the opaque patterns of the mask have a total surface area less than 15%, 10%, 5%, or 1% of the mask surface area.

3. The instrument according to claim 1, wherein the mask patterns are arranged as a two-dimensional periodic matrix.

4. The instrument according to claim 1, wherein the optical beam splitter comprises a plate beam splitter having an optical power distribution of 50-50, 40-60, 30-70, 10-90 or 20-80.

5. The instrument according to claim 1, further comprising:

another sensor configured to measure a power of a light beam scattered by the sample; and a signal processing system configured to extract from the scattered light measurement a measurement of the surface roughness of the sample.

6. The instrument according to claim 1, wherein the single light source comprises a light source that is one of a halogen lamp and a light-emitting diode.

7. A method for performing measurements in situ, the method comprising:

providing the instrument of claim 1; and using said instrument in combination with a treatment apparatus for measurements in situ.

8. A method for simultaneously measuring at least one radius of surface curvature and reflectivity of a sample, the method comprising:

using a single light source for the simultaneous measurements of the at least one radius of the surface curvature and the reflectivity of the sample, a mask being disposed between the single light source and the surface of the sample, the mask having a transparent background and opaque patterns arranged at predetermined positions on the mask surface, the opaque patterns of the mask having a total surface area smaller than a surface area of the transparent background, the light source being used to illuminate the mask to generate by transmission through the mask a collimated light beam incident on the surface of the sample, and to form a light beam reflected by the sample;

placing an optical beam splitter in order to receive the reflected light beam and to transmit one part of the reflected beam towards an imaging system and a camera that thereby form an image of the mask by reflection on the sample and another part of the reflected light beam toward a spectrometer that thereby measures a power of the other part of the reflected light beam;

processing, with an image processing system, the image of the mask by reflection on the sample surface;

calculating, with the image processing system, respective positions of the patterns in said image;

comparing, using the image processing system, the predetermined positions of the mask patterns with the calculated positions of the patterns in the image, and performing, with the image processing system, the simultaneous measurements in real time at a frequency up to 100 Hz of (i) the at least one radius of the surface curvature of the sample based on the compared predetermined position with the calculated positions and (ii) the reflectivity of the sample based on the measured power of the other part of the reflected light beam.

* * * * *